(12) United States Patent
Rai (10) Patent No.: US 7,916,969 B2
(45) Date of Patent: Mar. 29, 2011

(54) VARYING THE EXPOSURE OF A DIGITAL IMAGE BY REGION

(75) Inventor: Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 1040 days.

(21) Appl. No.: 11/690,284

(22) Filed: Mar. 23, 2007

(65) Prior Publication Data

US 2008/0232710 A1    Sep. 25, 2008

(51) Int. Cl.
*G06K 9/36* (2006.01)

(52) U.S. Cl. ........ 382/275; 382/260; 382/274; 382/278; 358/3.26; 358/3.27; 358/463

(58) Field of Classification Search .................. 382/260, 382/274, 278, 3.26, 3.27, 463
See application file for complete search history.

(56) References Cited

U.S. PATENT DOCUMENTS

| | | | |
|---|---|---|---|
| 4,706,123 A | 11/1987 | Chautemps | |
| 6,629,051 B2 * | 9/2003 | Tanaka | 702/81 |
| 6,665,010 B1 | 12/2003 | Morris et al. | |
| 6,738,510 B2 * | 5/2004 | Tsuruoka et al. | 382/167 |
| 6,831,689 B2 | 12/2004 | Yadid-Pecht | |
| 6,940,545 B1 * | 9/2005 | Ray et al. | 348/222.1 |
| 6,963,369 B1 | 11/2005 | Olding | |
| 7,023,484 B2 | 4/2006 | Watanabe | |
| 7,088,865 B2 * | 8/2006 | Ejima et al. | 382/232 |
| 7,180,050 B2 * | 2/2007 | Imagawa et al. | 250/221 |
| 2006/0082675 A1 | 4/2006 | McGarvey et al. | |

* cited by examiner

*Primary Examiner* — Yosef Kassa
(74) *Attorney, Agent, or Firm* — Mark P. Watson (57) ABSTRACT

Methods and apparatus for creating a digital image in which exposure varies by region of the image are described. The image may be created from first and second images. In one embodiment, a method comprises writing pixels of the first image that are within a first region of a space to pixel locations in a memory that correspond with coordinates of the respective first image pixels. A replacement pixel is generated by combining a pixel of the first image that is within the first region with a spatially corresponding pixel of a second image. The replacement pixel is written to a pixel location in the memory that corresponds with the coordinates of the replacement pixel. Pixels of the first image that are within a second region of the space may be written to pixel locations in the memory that correspond with the coordinates of the respective first image pixels.

21 Claims, 8 Drawing Sheets

VARYING THE EXPOSURE OF A DIGITAL IMAGE BY REGION

TECHNICAL FIELD

The present invention is in the field of digital image processing. More specifically, the present invention relates to generating a digital image in which exposure varies by region of the image.

BACKGROUND

In photography, there is often a need to adjust brightness of different parts of an image. For example, consider an image captured in the midday sun. If an exposure is selected so that brightly lit objects are accurately captured, shadowed objects will be very dark and lack detail. On the other hand, if an exposure is selected so that shadowed objects are accurately captured, the brightly lit objects will appear washed out.

Traditionally, this problem has been solved with a "fill flash" technique. A flash unit illuminates areas that would otherwise be in shadow. One disadvantage of using a fill flash is that it requires knowledge and training that is beyond what many amateur photographers possess. Another disadvantage is that it requires a flash attachment for the camera.

In conventional film photography, this problem has also been solved with dark room techniques, such as "dodging" an area of a print to make it lighter or "burning" an area of a print to make it darker. However, the traditional dodging and burning techniques are not available to digital photographers.

In digital photography, special purpose digital photo manipulation software running on a personal computer can be used to manipulate a digital image. For the casual photographer this approach has several disadvantages. The software is expensive, requires powerful hardware, and requires a substantial investment of time to learn how to use the software. Moreover, the casual photographer is accustomed to seeing a captured image immediately. With special purpose photo manipulation software, there is a significant time delay before the corrected image may be seen.

Accordingly, there is a need for methods and apparatus for generating a digital image in which exposure varies by region of the image.

SUMMARY

Methods and apparatus for creating a digital image in which exposure may be varied by region of the image are described. The image may be created from two or more images and pixels of the images have coordinates in a space. In one embodiment, pixels of a first one of the images that are within a first region of the space are written to pixel locations in a device that correspond with the coordinates of the respective first image pixels. In addition, replacement pixels are generated by combining each pixel of the first image that is within the first region with a spatially corresponding pixel in a second one of the images. Each replacement pixel has the same coordinates as the pixels from which it is generated. Further, each of the replacement pixels may be written to a pixel location in the device that corresponds with the coordinates of the replacement pixel.

In another embodiment, pixels of a first one of the images that are within a second region of the space are written to pixel locations in the device that correspond with the coordinates of the respective first image pixels. In yet another embodiment, pixels of a second one of the images that are within the second region are written to pixel locations in the device that correspond with the coordinates of the respective second image pixels, where the second region pixels of the second image are written to the device after the second region pixels of the first image are written to the device. In still another embodiment, pixels of a first one of the images that are within the second region are discarded.

Moreover, in one embodiment, a first image pixel may be combined with a spatially corresponding second image pixel in the second image to generate a replacement pixel by adding the respective pixels. In an alternative embodiment, a first image pixel may be combined with a spatially corresponding second image pixel in the second image to generate a replacement pixel by subtracting one pixel from the other. Further, in various embodiments, the device is a memory.

In a further embodiment, a digital image in which exposure may be varied by region of the image is created. The image may be created from two or more images and pixels of the images have coordinates in a space. Pixels of a first one of the images that are within a first region of the space are written to pixel locations in a device that correspond with the coordinates of the respective first image pixels. In addition, pixels of a second one of the images that are within a second region of the space are written to pixel locations in the device that correspond with the coordinates of the respective second image pixels. The second image has an exposure period that is distinct from the exposure period of the first image. In one alternative, the device is a memory.

Another embodiment is directed to a display controller. The display controller comprises a memory to store image data, a position determining unit, and a combining unit. The memory has a plurality of pixel locations for pixels of an image. The pixel locations correspond with the coordinates of the respective pixels in a space. The position determining unit determines whether a pixel is within one of at least a first and second region of the space. The combining unit generates replacement pixels. The combining unit combines a pixel of a first image that is within the first region with a spatially corresponding pixel of a second image. The replacement pixel has the same coordinates as the pixels from which it is generated. The combining unit stores the replacement pixel in a pixel location in the memory that corresponds with the coordinates of the replacement pixel.

In one embodiment, the position determining unit stores a first image pixel that is within the first region in a pixel location in the memory that corresponds with the coordinates of the first image pixel. In one embodiment, the position determining unit stores a first image pixel that is within the second region in a pixel location in the memory that corresponds with the coordinates of the pixel. In another embodiment, the position determining unit stores a second image pixel that is within the second region in a pixel location in the memory that corresponds with the coordinates of the second image pixel. In yet another embodiment, the combining unit reads a first image pixel that is within the first region from the memory.

In one embodiment, the combining unit combines a first image pixel with a spatially corresponding second image pixel to generate a replacement pixel by adding the pixels. Alternatively, the combining unit combines a first image pixel with a spatially corresponding second image pixel to generate a replacement pixel by subtracting one pixel from the other. In addition, in one embodiment the display controller generates a replacement pixel in real-time.

Moreover, one alternative embodiment is directed to a display controller. The display controller comprises a memory and a position determining unit. The memory is employed to store image data. The memory has a plurality of pixel locations for pixels of an image. The pixel locations correspond with the coordinates of the respective pixels in a space. The position determining unit determines whether a pixel is within one of at least a first and second region of the space. The position determining unit writes pixels of a first image that are within a first region to pixel locations in the memory that correspond with the coordinates of the respective first image pixels. In addition, the combining unit writes pixels of a second image that are within the second region to pixel locations in the device that correspond with the coordinates of the respective second image pixels. The second image has an exposure period that is distinct from the exposure period of the first image.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

Generally, the same reference numbers are used in the drawings and the description to refer to the same or like parts, elements, or steps.

DETAILED DESCRIPTION

Figure 1:
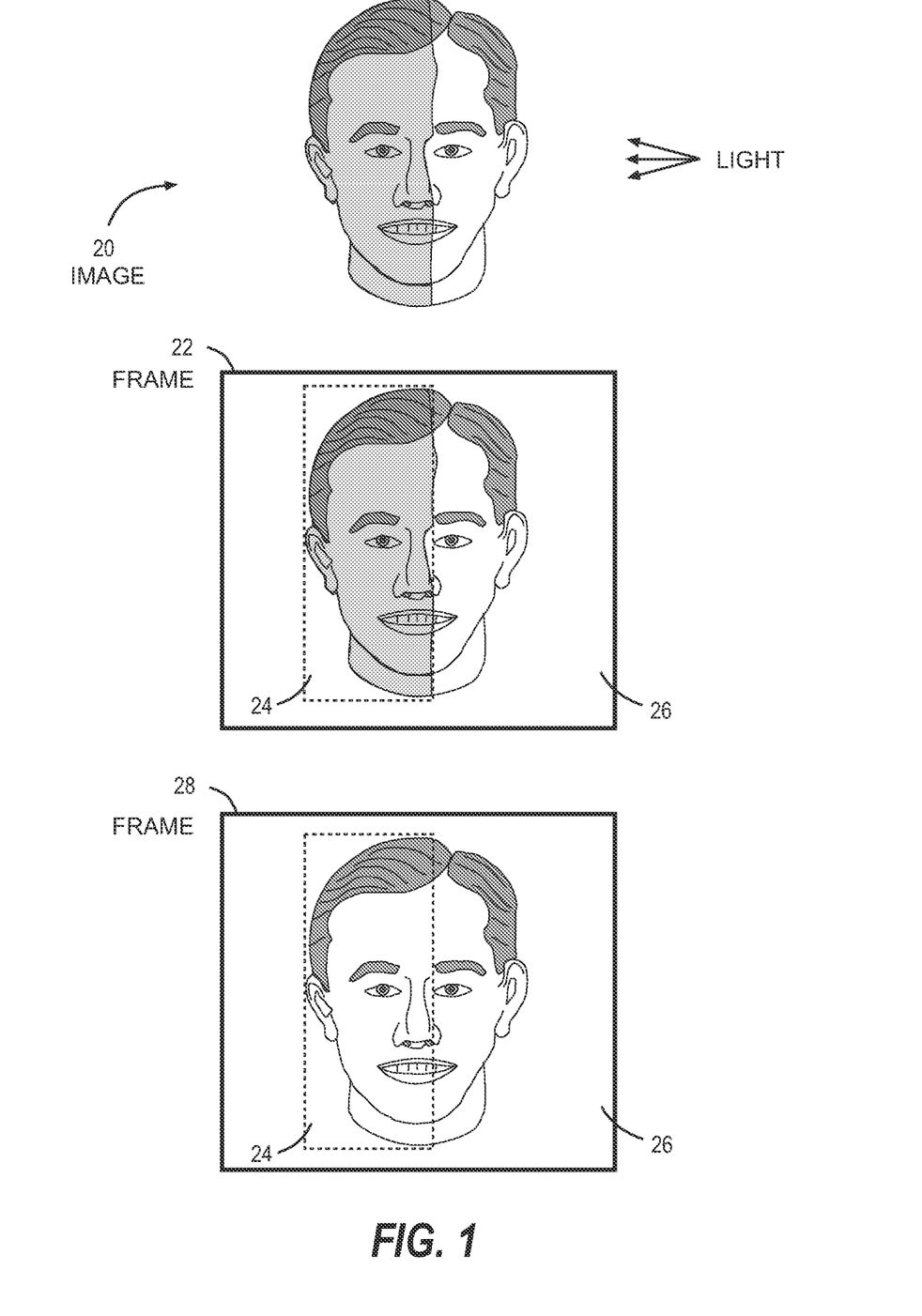
FIG. 1 illustrates an image, a first prophetical frame of the image captured at a first exposure, the first frame having first and second regions, and a second prophetical frame having exposures that vary by region of the image.

FIG. 1 illustrates an image 20 of a face lit from the side. As a result of this lighting, the left side of the face is in shadow. The image 20 is preferably more or less stationary, however, this is not critical. A prophetical frame 22 shows how the image 20 might appear when captured at a single exposure of, for example, 0.004 seconds. The frame 22 includes a first region 24, which includes the shadowed portion, and a second region 26. FIG. 1 also shows a second frame 28. The second frame 28 is a prophetical frame of the image 20 in which exposure varies by region of the image. For example, the first region 24 of frame 28 has an exposure of 0.008 seconds and the second region 26 has an exposure of 0.004 seconds. In the prophetical frame 28, the image 20 appears without the shadow on the left side of the face.

Figure 2:
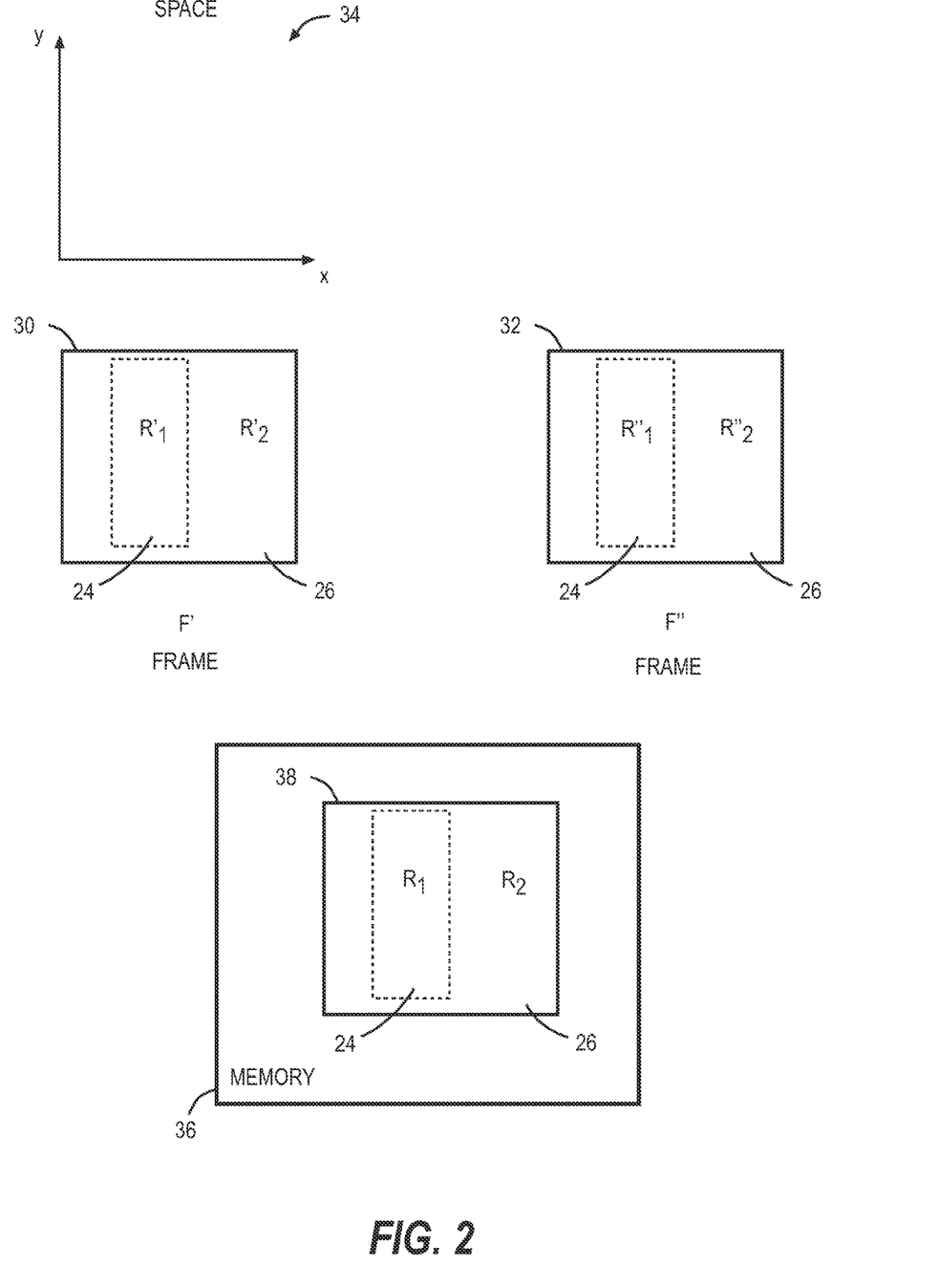
FIG. 2 is a diagram of prophetical first and second frames, a space, and a memory having a third frame stored in the memory, each of the frames having first and second regions.

FIG. 2 shows prophetical first and second frames 30, 32 that include the first and second regions 24, 26. The frames 30, 32 are alternatively designated F' and F", respectively. The frames 30, 32 as used below in this description include image data captured at different times. The frames 30, 32 may both be created as a result of capturing the same image 20, however, the frames may be created from separate capture operations. For example, the frame 30 may result from capturing the image 20 at a first point in time, and the frame 32 may result from capturing the image 20 at a second point in time. The two frames may be captured at closely spaced points in time, however, this is not essential. For example, the first and second frames 30, 32 may be separated by 0.001 seconds, 0.01 seconds, 0.1 seconds, or 1 second. Longer or shorter intervals are also contemplated. In addition, the two exposures may be of the same or different durations.

Alternative designations are also employed for the first and second regions 24, 26. In the first frame F', the first and second regions 24, 26 are also respectively designated $R'_1$ and $R'_2$. In the second frame F", the first and second regions 24, 26 are respectively designated $R''_1$ and $R''_2$.

The image data in the frames 30, 32 is comprised of a matrix of pixels. Each of the pixels in each of the frames has a location in a two-dimensional space 34. In other words, the location of each pixel in each of the frames may be defined by a pair x and y coordinates. While a pixel is the smallest complete sample in an image, a pixel may be comprised of multiple components, e.g., individual red, blue, and green components ("RGB"). The data that defines a pixel may thus be comprised of three distinct datum. For example, three bytes may be used to define each of the color components of an RGB pixel.

A memory 36 is also shown in FIG. 2. A portion of this memory 36 is allocated for storing one frame of image data. The memory 36 may include numerous memory locations. Each memory location stores one or more bits of data. In this description and in the claims, the term "pixel location" is used to refer to one or more memory locations within a memory that are used for storing one complete pixel. Using this terminology, the memory 36 can be said to include numerous pixel locations. Thus, if the RGB pixels of a frame are defined by three bytes, each pixel location may designate three distinct memory locations, each for storing one byte. The memory locations that comprise a pixel location need not be in any particular location in the memory. For instance, they may be contiguous memory locations, or all of the components of a particular type may be grouped together. What is important is that the pixel locations in the memory 36 correspond with the coordinates of pixels in the space 34. In other words, the spatial location of each pixel in each of the frames corresponds with a distinct pixel location in the memory. As mentioned, the spatial location of each pixel may be expressed with an (x, y) coordinate. Where a pixel location includes two or more memory locations, e.g., for storing color components, the coordinate location of a pixel corresponds with each of the two or more locations.

FIG. 2 shows a prophetical frame 38 stored in the memory 36. Because of the correspondence between pixel locations in the memory 36 and the coordinates of each pixel in each of the frames 30, 32, every pixel in the frame 30 will correspond to both a distinct pixel location in the memory 36 and to a distinct pixel in the frame 32. Similarly, every pixel in the frame 32 will correspond to both a distinct pixel location in the memory 36 and to a distinct pixel in the frame 30. The frame 38 also includes the regions 24 and 26.

The regions 24, 26 may be defined in a variety of ways. The regions 24, 26 may be rectangular and, in this case, can be defined by a pair of (x, y) coordinates. However, the first and second regions 24, 26 may take other shapes, e.g., circular, elliptical, irregular, etc., and may be defined by any function suitable for defining the desired shape. In FIG. 2, the first and second regions are designated $R_1$ and $R_2$ in the frame 38 in the memory 36. Again, because of the correspondence between pixel locations in the memory 36 and the pixels in the frames, the pixels in region $R'_1$ spatially correspond with the pixels in region $R''_1$, as well as with region $R_1$ in the memory 36. A similar correspondence also exists for the regions $R'_2$, $R''_2$, and $R_2$.

Two or more digital images may be combined by summing the data values of spatially corresponding pixels of the images. Where the pixels are represented by multiple components, the frames may be combined by summing the respective components of spatially corresponding pixels. In addition to summing, two or more digital images may be combined by subtracting one image from the other.

Figure 3:
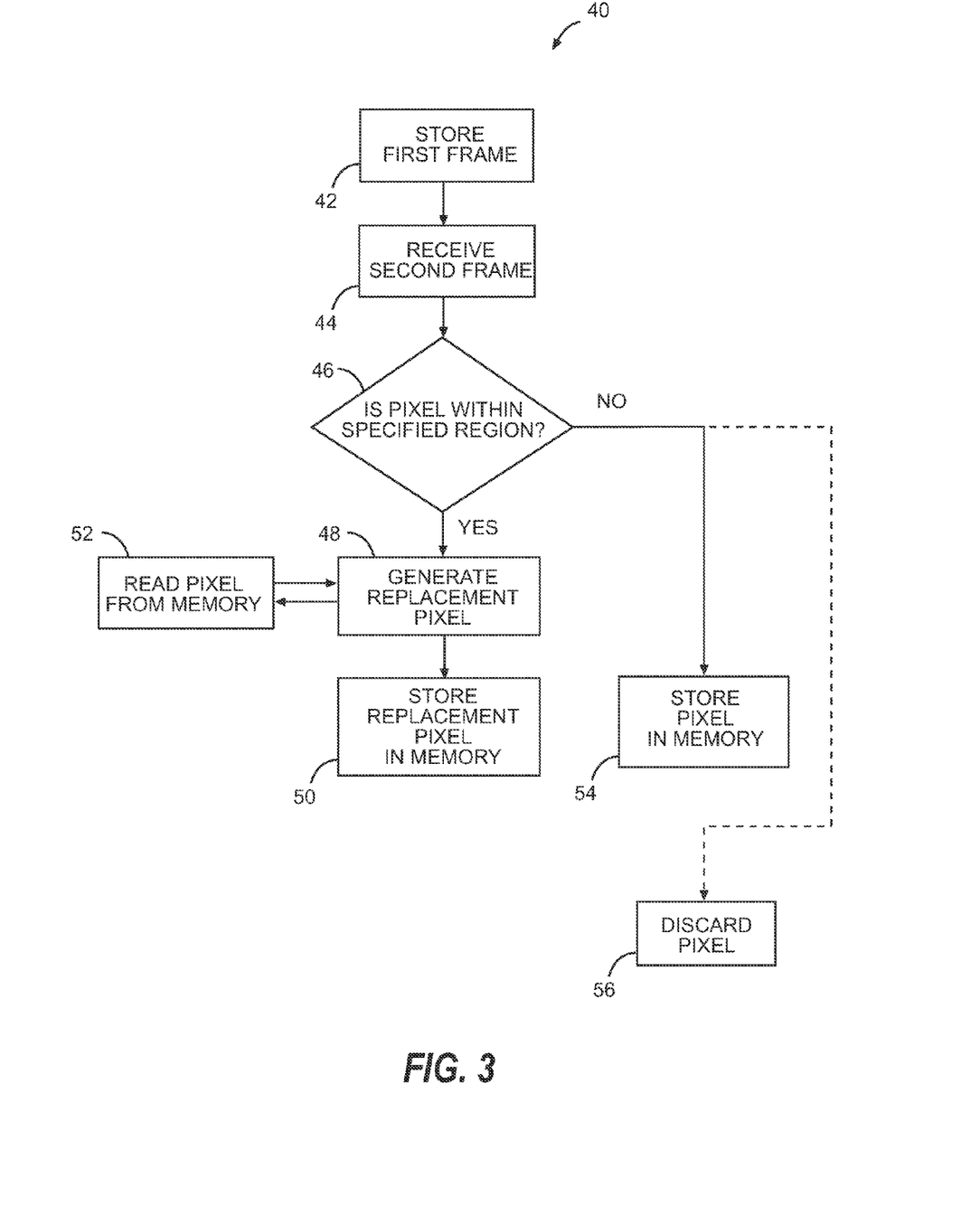
FIG. 3 is a flow diagram illustrating methods according to various embodiments.

FIG. 3 is a flow diagram of a method 40 that illustrates in a general manner several ways that a frame or digital image having exposures that vary by region may be created. The method 40 may be performed in any hardware device having a memory of sufficient size to store one frame. It is generally not necessary, however, for the memory to have capacity for storing more than one frame. In one embodiment, the memory may have capacity for storing less than one frame. In addition, various methods according to the invention may be performed partially in hardware and partially in software. With respect to the method 40, assumptions are made that the first and second regions 24, 26 have been previously defined in the space 34, and that one of the two regions has been "specified" as described below. Particular steps of the method 40 may be performed a pixel at a time. Steps according to various embodiments of the invention may be performed in raster order. Alternatively, steps may be performed on pixels arranged in any desired order.

Referring to FIG. 3, a first frame 30 is stored in the memory (step 42). In one embodiment, the step 42 of storing may store both the first and second regions of the first frame in the memory. A second frame is received (step 44). The first and second frames may be received a pixel at a time. In one embodiment, a determination is made for each pixel of the second frame as to whether the pixel is within the first or second regions (step 46). Specifically, either the first or second region may be "specified." The step 42 then determines whether a particular pixel is within the specified region. Each pixel of the first frame that is within the specified region is combined with a spatially corresponding pixel in the second frame (step 48). (Except where noted, the examples that follow assume that spatially corresponding pixels of the first and second frames are combined by addition.) A replacement pixel is generated in step 48 as a result of combining the spatially corresponding pixels of the two frames. In order to combine the two pixels in step 48, it may be necessary to read the corresponding pixel of the first frame from the memory (step 52). The two pixels may be combined by summing the two pixels or by subtracting one pixel from the other. The replacement pixel that is generated is assigned the same coordinates as the two pixels from which it was created. The replacement pixel is stored in a pixel location in the memory that corresponds with the replacement pixel's coordinates (step 50).

Pixels of the second frame that are not found to be in the specified region may be stored in the memory (step 54) or, alternatively, they may be discarded (step 56). If pixels of the second frame that are outside of the specified region are stored in the memory in step 54, they are stored in pixel locations that correspond with the coordinates of the respective pixels. In addition, the pixels of the second frame that are outside of the specified region are stored in an operation that destroys the pixel previously stored in the same pixel location. That is, the pixels of the second frame that are located outside of the specified region may be stored in a destructive write operation, which replaces pixels of the first frame that are outside of the specified region and that may have been stored in the same pixel location in step 42.

Figure 4A:
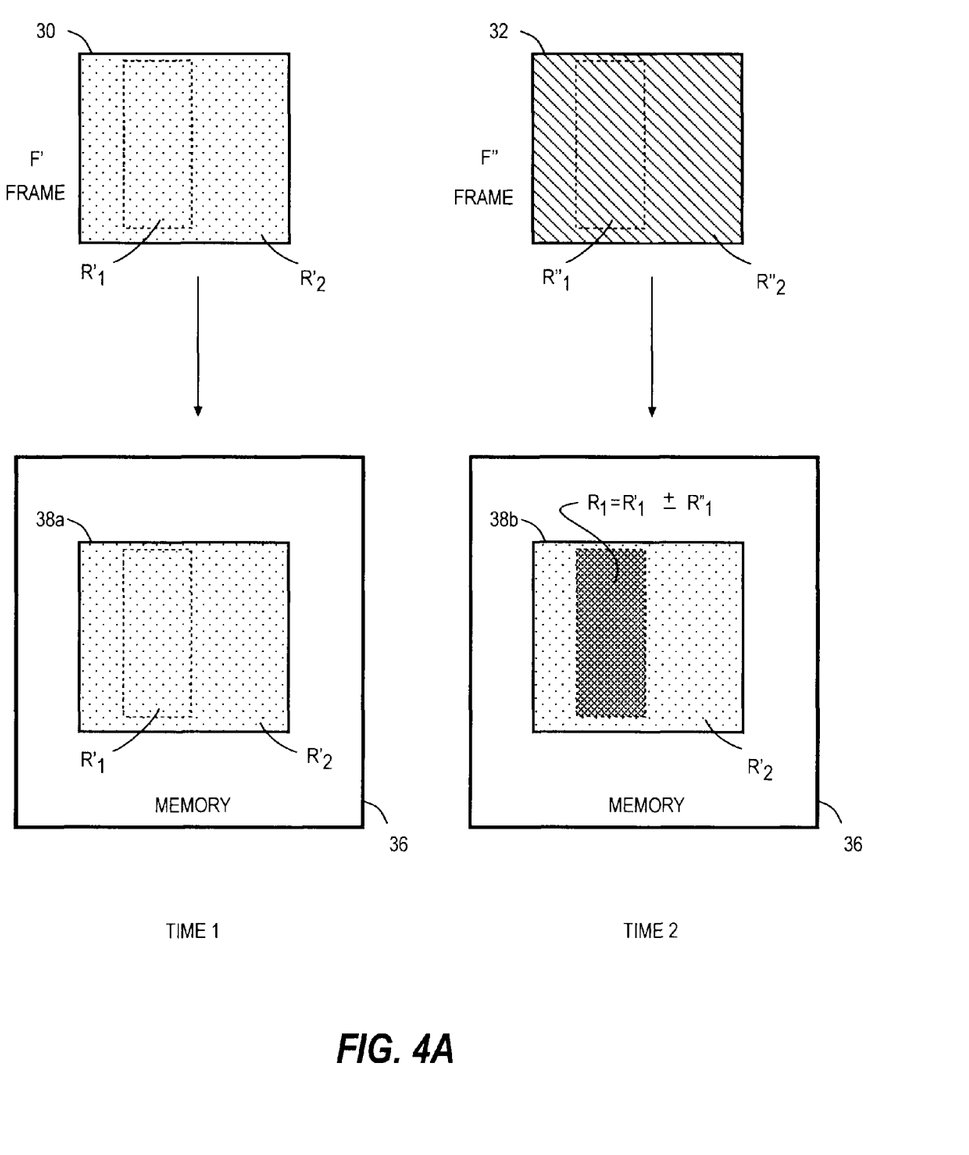
FIG. 4A is a diagram of the first and second frames of FIG. 2, the first and second frames including image data, and the memory of FIG. 2 at first and second points in time, the image data of the frames being stored in the memory, the figure illustrating one example of creating an image having exposures that vary by region.

Several examples further illustrate variations of the method 40. In the examples, it is assumed that the "specified" region is the first region, i.e., $R'_1$, $R''_1$. Referring to FIG. 4A, a first example is shown. A first frame 30 is stored in the memory 36 at time 1 (step 42). The first frame 30 is stored in the memory as frame 38a. At time 2, the second frame is received (step 44). The position of each pixel of the second frame in the space 34 is evaluated to determine whether or not the particular pixel is within the specified region (step 46). Replacement pixels $R_1$ are generated for pixels within the specified region (step 48). In this example, replacement pixels $R_1$ are generated by adding pixels in the first region of the first and second frames, i.e., $R'_1 + R''_1$. Replacement pixels $R_1$ are also stored in the memory at time 2 (step 50). In addition, the pixels $R''_2$ of the second frame that are not within the specified region are discarded (step 56). Thus, at time 2 the frame 38b stored in the memory is comprised of replacement pixels $R_1 = R'_1 + R''_1$ in the specified region, and pixels $R'_2$ the second region. If the first and second frames 30, 32 are both exposed at 0.004 seconds, then the first region $R_1$ in the frame 38b will have an exposure, assuming the pixels are combined by summing, of 0.008 seconds, and the second region $R'_2$ in the frame 38b will have an exposure of 0.004 seconds.

As one alternative, the spatially corresponding pixels of the first and second frames are combined in the example of the preceding paragraph by subtraction instead of addition. If the first frame 30 is exposed at 0.008 seconds, and the second frame 32 is exposed at 0.004 seconds, then the first region in the frame 38b will have an exposure of 0.004 seconds ($R_1 = R'_1 - R''_1$), and the second region $R'_2$ in the frame 38b will have an exposure of 0.008 seconds.

Figure 4B:
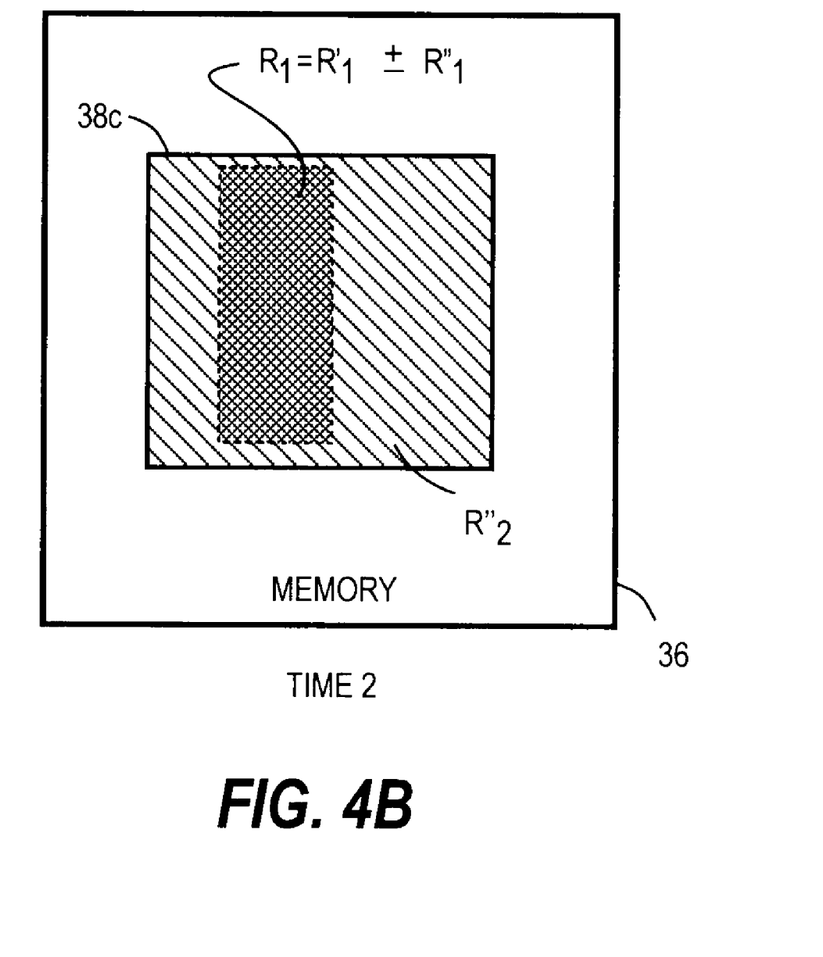
FIG. 4B is a diagram of the memory of FIG. 2 at the second point in time, the figure illustrating another example of creating an image having exposures that vary by region.

FIG. 4B shows an alternative example that is similar to that shown in FIG. 4A, except that the pixels $R''_2$ of the second frame that are not within the specified region are stored in the memory rather than being discarded. In this alternative example, steps 42-52 are the same as described above with respect to FIG. 4A. However, in this alternative, the step 56 of discarding pixels $R''_2$ of the second frame that are not within the specified region is not performed. Instead, pixels $R''_2$ of the second frame that are not within the specified region are stored in the memory, replacing the pixels $R'_2$ of the frame that are not within the specified region (step 54). Like the example of FIG. 4A, if the first and second frames 30, 32 are both exposed at 0.004 seconds, then the first region $R_1$ in the frame 38b will have an exposure, assuming the frames are combined by summing, of 0.008 seconds and the second region $R''_2$ in the frame 38b will have an exposure of 0.004 seconds.

Figure 5:
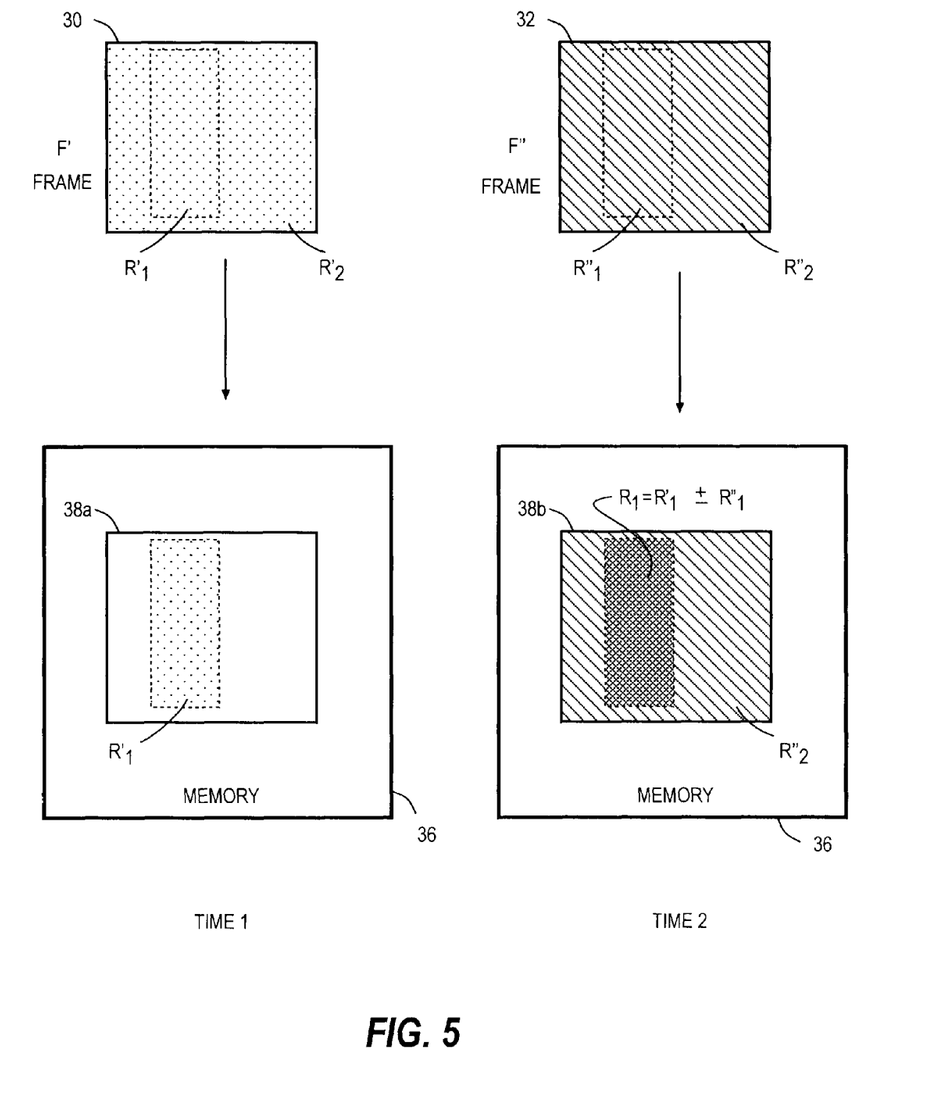
FIG. 5 is a diagram of the first and second frames of FIG. 2, the first and second frames including image data, and the memory of FIG. 2 at first and second points in time, the figure illustrating yet another example of creating an image having exposures that vary by region.

FIG. 5 illustrates another example of creating a frame having exposures that vary by region. According to this alternative, the step 42 of the method 40 does not store the full first frame. Instead, only those pixels $R'_1$ of the first frame that are within the specified first region are stored in the memory. Pixels $R'_2$ of the first frame are discarded. Steps 44-52 are the same as described above with respect to FIGS. 4A, 4B. With respect to pixels of the second frame that are not found to be in the specified region, i.e., pixels $R''_2$, these pixels are stored in the memory in step 54. In this alternative, the step 56 is not performed. Like the examples of FIGS. 4A, 4B, if the first and second frames 30, 32 are both exposed at 0.004 seconds, then the first region $R_1$ will have an exposure of 0.008 seconds ($R_1=R'_1+R''_1$), and the second region will have an exposure of 0.004 seconds.

With respect to the flow diagram FIG. 3, it was stated above that the step 42 of storing may store both the first and second regions of the first frame in the memory. It was also stated that the memory may have capacity for storing less than one frame. FIG. 5 is one example of where the memory may have capacity for storing less than one frame. In particular, the memory for performing the step 42 need only be large enough to store a first region of a frame. As mentioned, in the example of FIG. 5, pixels of the second frame that are not within the specified region, i.e., the pixels $R''_2$, are stored in the memory in step 54. However, this memory need not be the same memory as is used to store in step 42 to store the pixels $R'_1$ of the first frame that are within the specified first region. In other words, referring to FIG. 5, the pixels $R'_1$ may be stored in a first memory and the pixels $R_1=R'_1+R''_1$ and $R''_2$ may be stored in a second memory (or written to a device having a space 34, e.g., a display device). The first memory may have capacity for storing less than one frame while the second memory or device has the capacity for storing or receiving a full frame.

Figure 6:
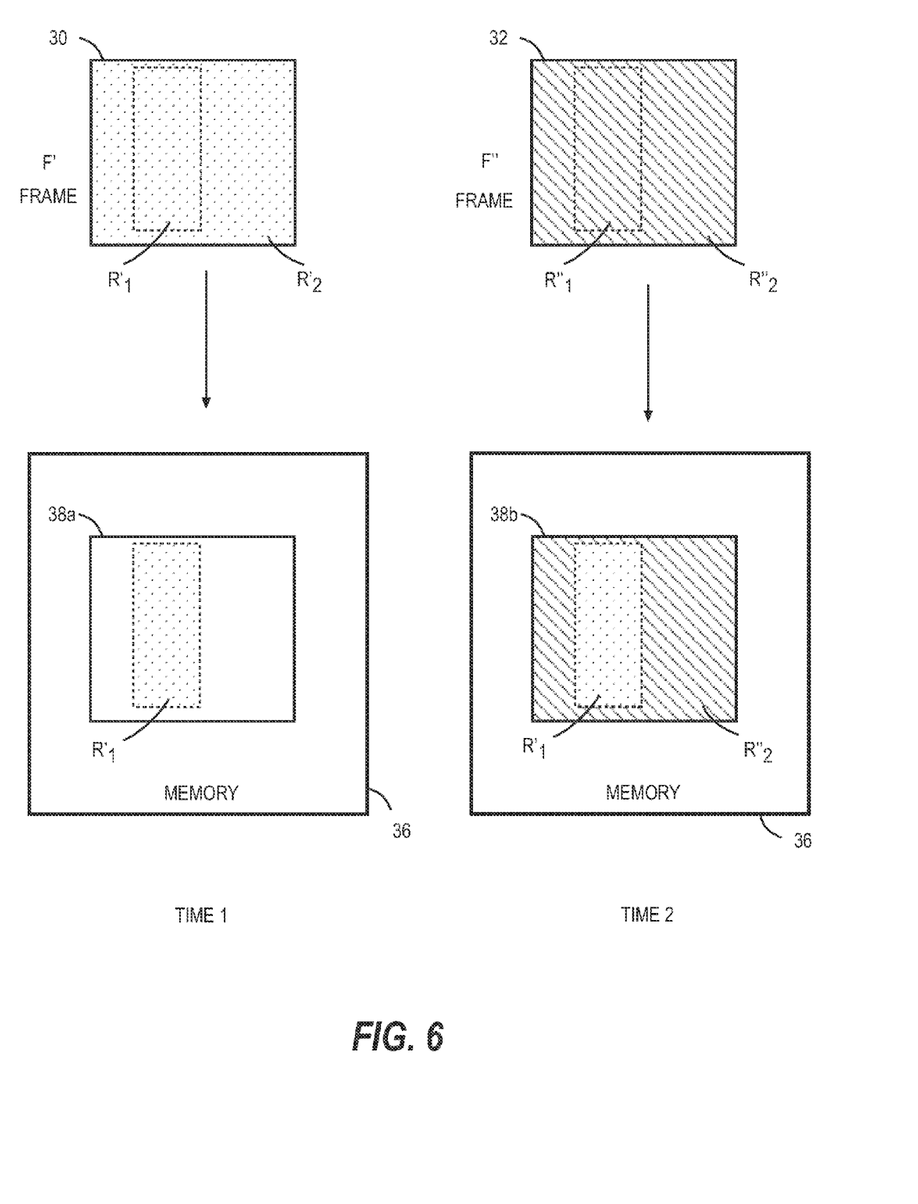
FIG. 6 is a diagram of the first and second frames of FIG. 2, the first and second frames including image data, and the memory of FIG. 2 at first and second points in time, the figure illustrating an additional example of creating an image having exposures that vary by region.

FIG. 6 illustrates yet another example of creating a frame having exposures that vary by region. In this alternative, the first and second frames are captured with different exposures. For example, the first frame 30 may be captured at an exposure of 0.008 seconds and the second frame may be captured at an exposure of 0.004 seconds. In addition, in this example, the step 42 does not store the full first frame. Instead, only those pixels $R'_1$ of the first frame that are within the specified first region are stored in the memory in step 42. Pixels $R'_2$ of the first frame are discarded. Steps 42-46 are the same as described above with respect to FIGS. 4A, 4B, and 5. However, replacement pixels are not generated (step 48) or stored in the memory (step 50). Pixels $R''_1$ of the second frame are discarded. With respect to pixels of the second frame that are not found to be in the specified region, i.e., pixels $R''_2$, these pixels are stored in the memory in step 54. In this alternative, the step 56 is generally not performed. Like the examples above, and the pixels $R'_1$ of the first region will have an exposure of 0.008 seconds, and the pixels $R''_2$ of the second region have an exposure of 0.004 seconds.

Figure 7:
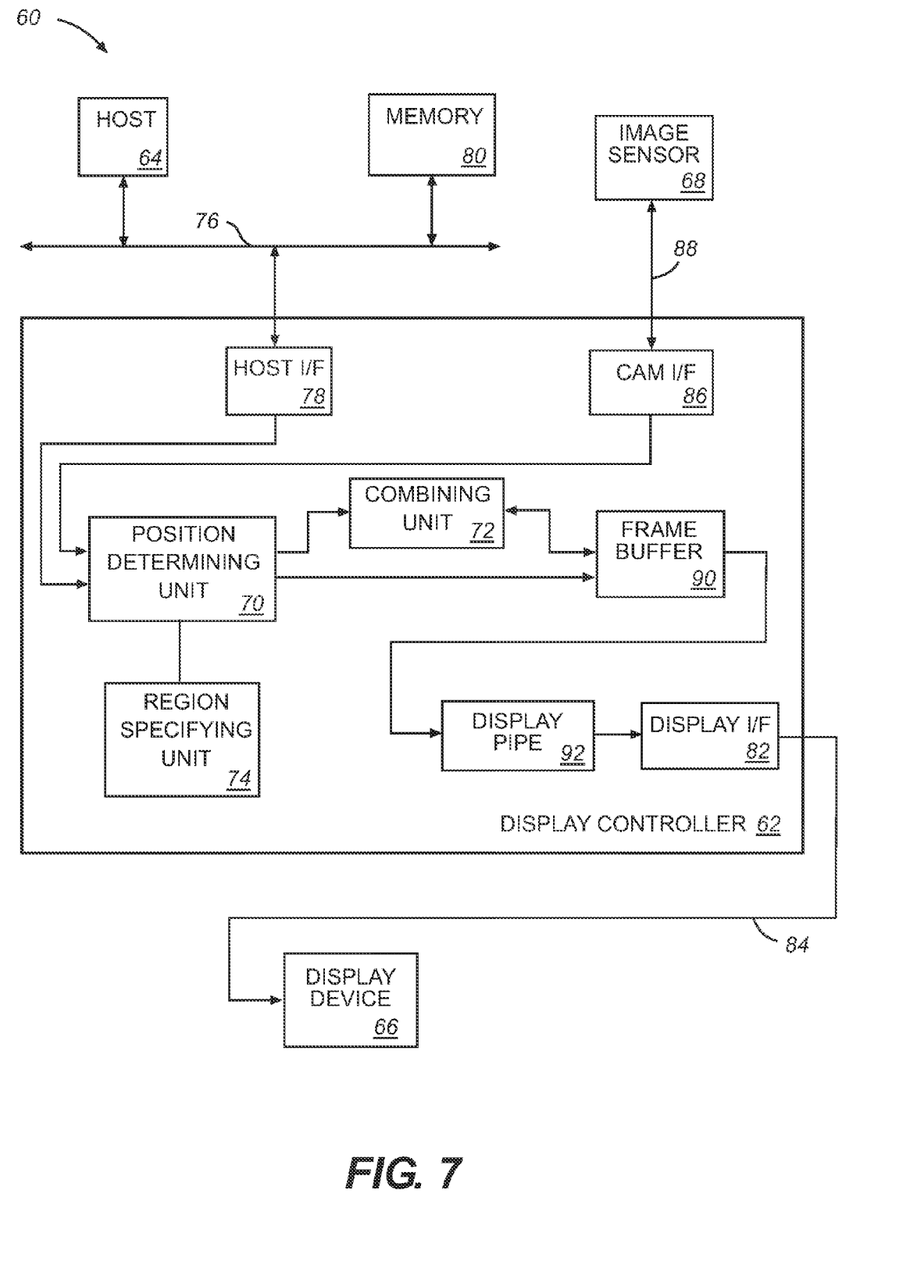
FIG. 7 is a simplified block diagram of an exemplary display system for providing frames that have different exposures in different regions of the frame.

FIG. 7 is a simplified block diagram of one embodiment of a display system in which the exposure of a digital image may be varied by region. The system 60 may be a mobile device (defined below). Where the system 60 is a mobile device, it is typically powered by a battery (not shown). The system 60 may include a display controller 62, a host 64, at least one display device 66 and one or more image data sources, such as image sensor 68.

Because the host 64 may be a source of image data, the term "image data source" is intended to include the host 64. While the system 60 may include multiple display devices and image data sources, this is not essential. In other embodiments, a single display device or a single image data source may be provided.

The display controller 62 interfaces the host 64 and image sensor 68 with the display device 66. In the shown embodiment, the display controller 62 is used to generate a digital image in which exposure varies by region. In one embodiment, a position determining unit 70, a combining unit 72, and a region specifying unit 74 are provided in the display controller for this purpose. In another embodiment, the combining unit 72 may be omitted. It is not essential that the units 70, 72, and 74 be provided in a display controller. The exposure of a digital image may be varied by region in a standalone unit or by other units in a system. In one embodiment, the display controller 62 is a separate integrated circuit from the remaining elements of a system, that is, the display controller is "remote" from the host, image sensor, and display device.

The host 64 is typically a microprocessor, but it may be a digital signal processor, a computer, or any other type of device or machine that may be used to control operations in a digital circuit. Typically, the host 64 controls operations by executing instructions that are stored in or on a machine-readable medium. The host 64 communicates with the display controller 62 over a bus 76 to a host interface 78 in the display controller 62. Other devices may be coupled with the bus 76. For instance, a memory 80 may be coupled with the bus 76. The memory 80 may, for example, store instructions or data for use by the host 64, or image data that may be rendered using the display controller 62. The memory 80 may be an SRAM, DRAM, Flash, hard disk, optical disk, floppy disk, or any other type of memory.

A display device interface 82 is included in the display controller 62. The display device interface 82 provides an interface between the display controller 62 and the display device 66. A display device bus 84 couples the display controller 62 and the display device 66. LCDs are typically used as display devices in mobile devices, but the display device 66 (defined below) may be any type of display device.

The image sensor 68 may be, for example, a charge-coupled device ("CCD") or a complementary metal-oxide semiconductor ("CMOS") sensor. A camera interface 86 ("CAM I/F") is included in the display controller 62. The camera interface 86 is coupled with the image sensor 68 and receives pixel data output on data lines of a bus 88. Typically, the camera interface 86 also receives vertical and horizontal synchronizing signals from the image sensor 68 and provides a clocking signal to the image sensor 68 for clocking pixel data out of the sensor. These signals may be transmitted via the bus 88 or via a separate bus (not shown).

The position determining unit 70 receives image data from the image sensor 68 via the camera interface 86, from the host 64 or memory 80 via the host interface 78, or from any other desired image data source. The position determining unit 70 may provide image data to the combining unit 72 or to a memory 90 for temporary storage before display. The combining unit 72 may also provide image data to the memory 90. The region specifying unit 74 is coupled with the position determining unit 70. The position determining unit 70, the combining unit 72, and the region specifying unit 74 are described in more detail below.

The memory 90 may be included in the display controller 62. In other embodiments, however, the memory 90 may be remote from the display controller. The memory 90 may be used as a frame buffer for storing image data (and may be alternately referred to as a frame buffer or frame buffer memory), but may also be used for storing other types of data. For purposes of creating a digital image in which exposure varies by region, the memory 90 is of sufficient size to store one frame, but it is not necessary for the memory 90 to have capacity for storing more than one frame. In one embodiment, the memory may have capacity for storing just one region of a frame. The memory 90 is of the SRAM type, but the memory 90 may be a DRAM, Flash memory, hard disk, optical disk, floppy disk, or any other type of memory. The memory 90 may be coupled with the position determining unit 70 and the combining unit 72, thereby allowing a digital image having exposure varying by region to be stored in the memory. The memory 90 may be coupled with other units within the graphics controller 62 as necessary or desired.

A display pipe 92 is included in the display controller 62. The memory 90 may be coupled with an input to the display pipe 92. An output of the display pipe 92 may be coupled with the display interface 82. Thus, a frame in which exposure varies by region of the image may be transferred from the memory 90 to the display device 66 via the display pipe 92 and display interface 82.

The position determining unit 70 may determine whether a pixel is of a first or second frame. If a pixel is of the first frame, the unit 70 may write the pixel of the first frame to the memory 90 for storage. In one embodiment, the unit 70 may write only those pixels of the first frame that are within a specified region to the memory 90 for storage. The position determining unit 70 may also determine whether a pixel that it receives is within a specified region. If the entire first frame is written to the memory 90, e.g., the example of FIG. 4A, the position determining unit 70 may not make this determination with respect to pixels of the first frame. On the other hand, if the unit 70 writes only those pixels of the first frame that are within a specified region to the memory 90, e.g., the example of FIG. 5, then the unit 70 makes this determination for each first frame pixel.

With respect to pixels of the second region, the position determining unit 70 may determine whether a pixel that it receives is within a specified region. If the pixel is not within the specified region, the unit 70 may discard the pixel. Alternatively, the unit 70 may store the pixel in the memory 90 in a destructive write operation.

When the combining unit 72 writes a pixel of the first frame to the memory 90 it generally writes the pixel to a pixel location in the memory that corresponds with the coordinates of the pixel.

In addition, with respect to pixels of the second frame, if the pixel is determined to be within the specified region, the unit 70 may write the pixel to the combining unit 72. The combining unit 72 may then generate a replacement pixel by combining the pixel of the second frame that is within the specified region with the spatially corresponding pixel of the first frame. The combining unit 72 may read the spatially corresponding pixel of the first frame from the memory 90. The combining unit 72 stores each of the replacement pixels in the memory 90 in pixel locations in the memory that correspond with the coordinates of the replacement pixel. However, in one alternative, the position determining unit 70 may discard a pixel of the second frame that is within the specified region instead of creating and storing a replacement pixel.

The region specifying unit 74 provides the position determining unit 70 with the locations of the first and second regions. In addition, the region specifying unit 74 provides support for an interface that may be employed for specifying a "specified" region. Regions 24, 26 may be specified in a variety of ways. For instance, a user may specify a region by inputting coordinates. The user may employ a stylus with a touch-sensitive screen to specify a region. In another alternative, a user may select from among several predetermined regions presented on the display screen. In addition to selection by a user, the specified region may be selected by an algorithm or a machine performing the algorithm, where the algorithm selects regions based upon an analysis of the image data.

Various ways in which a digital image may be created in which exposure varies by region have been described above by way of example. The examples refer only to first and second frames, and only to first and second regions. However, there is no intention to limit the present invention to only first and second frames, and only to first and second regions. In alternative embodiments, an image in which exposure varies by region may be created using any number of regions, or using any number of frames. For instance, as one example, a first, second, and third frame may be captured at an exposure of 0.003. The frames include first, second, and third regions. In addition, both the first and second regions are "specified." In this example, let all three regions of the first frame be written to memory at time T1. When the second frame is received at time T2, pixels in the first and second regions are stored in the memory in an additive write operation, while pixels in the third region are discarded. When the third frame is received at time T3, pixels in the first region are stored in the memory in an additive write operation, while pixels in the second and third regions are discarded. After time T3, the first region of the frame stored in the memory will have an exposure of 0.009 seconds, the second region will have an exposure of 0.006 seconds, and the third region will have an exposure of 0.003 seconds.

In the above description of the various ways in which a digital image may be created in which exposure varies by region, the use of a memory in this process was explained. It should be appreciated that the described methods and apparatus may be employed with any type of device having pixel locations defined in a space 34 and which may be written to. As one example, a display device may be substituted for the memory 90. A suitable display device may include an embedded memory and thus be capable of providing pixels of a first region of a first frame for combining with spatially corresponding values of a second frame. Alternatively, the described methods and apparatus may be employed with display device in a system that includes a memory sufficiently large for storing only a first region, but which is of insufficient size for storing a full frame, where the memory is used for reading pixels of a first region of a first frame for combining with spatially corresponding values of a second frame. In another alternative, a display device having a space 34 may be substituted for the memory 90 where there is no need for reading pixels of a first region of a first frame for combining with spatially corresponding values of a second frame, such as shown in the example of FIG. 6.

In this specification and in the claims, the terms "frame" and "image" are as used as synonyms.

The term "real-time," as used in this specification and in the claims, refers to operations that are performed with respect to an external time frame. More specifically, real-time refers to an operation or operations that are performed at the same rate or faster than a process external to the machine or apparatus performing the operation. As an example, a real-time operation for generating a digital image in which exposure varies by region of the image proceeds at the same rate or at a faster rate than the rate at which pixels are received from an image sensor or other image data source, or the rate at which pixels are required by a display device or circuitry driving the display device. In various embodiments of the present invention, a digital image in which exposure varies by region may be generated in real-time.

Embodiments of the claimed inventions may be used in a "mobile device." A mobile device, as the phrase is used in this description and the claims, means a computer or communication system, such as a mobile telephone, personal digital assistant, digital music player, digital camera, or other similar device. Embodiments of the claimed inventions may be employed in any device capable of processing image data, including but not limited to computer and communication systems and devices generally.

The term "display device" is used in this description and the claims to refer to any of device capable of rendering images. For example, the term display device is intended to include hardcopy devices, such as printers and plotters. The term display device additionally refers to all types of display devices, such as CRT, LED, OLED, and plasma devices, without regard to the particular display technology employed.

In this document, particular structures, processes, and operations well known to the person of ordinary skill in the art may not be described in detail in order to not obscure the description. As such, embodiments of the claimed inventions may be practiced even though such details are not described. On the other hand, certain structures, processes, and operations may be described in some detail even though such details may be well known to the person of ordinary skill in the art. This may be done, for example, for the benefit of the reader who may not be a person of ordinary skill in the art. Accordingly, embodiments of the claimed inventions may be practiced without some or all of the specific details that are described.

In this document, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

I claim:

1. A hardware implemented method for creating a digital image in which exposure varies by region of the image from two or more images, each of the pixels of the images having coordinates in a space, comprising:
    (a) writing pixels of a first one of the images that are within a first region of the space to pixel locations in a device that correspond with the coordinates of the respective first image pixels; and
    (b) generating replacement pixels by combining each pixel of the first image that is within the first region with a spatially corresponding pixel in a second one of the images, each replacement pixel having the same coordinates as the pixels from which it is generated.

2. The method of claim 1, wherein the step (b) further comprises writing each of the replacement pixels to a pixel location in the device that corresponds with the coordinates of the replacement pixel.

3. The method of claim 2, further comprising (c) writing pixels of a first one of the images that are within a second region of the space to pixel locations in the device that correspond with the coordinates of the respective first image pixels.

4. The method of claim 3, further comprising (d) writing pixels of a second one of the images that are within the second region to pixel locations in the device that correspond with the coordinates of the respective second image pixels, the step (d) being performed after the step (c).

5. The method of claim 2, further comprising discarding pixels of a first one of the images that are within a second region of the space.

6. The method of claim 5, further comprising writing pixels of a second one of the images that are within the second region to pixel locations in the device that correspond with the coordinates of the respective second image pixels.

7. The method of claim 1, wherein step (b) includes adding a first image pixel and a corresponding second image pixel.

8. The method of claim 1, wherein step (b) includes subtracting one of a first image pixel and a corresponding second image pixel from the other.

9. The method of claim 1, wherein the device is a memory.

10. A hardware implemented method for creating a digital image in which exposure varies by region of the image from two or more images, each of the pixels of the images having coordinates in a space, comprising:
    (a) writing pixels of a first one of the images that are within a first region of the space to pixel locations in a device that correspond with the coordinates of the respective first image pixels; and
    (b) writing pixels of a second one of the images that are within a second region of the space to pixel locations in the device that correspond with the coordinates of the respective second image pixels, wherein the second image has an exposure period that is distinct from the exposure period of the first image.

11. The method of claim 10, wherein the device is a memory.

12. A display controller comprising:
    (a) a memory to store image data, the memory having a plurality of pixel locations for pixels of an image, the pixel locations corresponding with the coordinates of the respective pixels in a space;
    (b) a position determining unit to determine whether a pixel is within one of at least a first and a second region of the space; and
    (c) a combining unit to generate a replacement pixel by combining each pixel of a first image that is within the first region with a spatially corresponding pixel of a second image, the replacement pixel having the same coordinates as the pixels from which it is generated, and to store the replacement pixel in a pixel location in the memory that corresponds with the coordinates of the replacement pixel.

13. The display controller of claim 12, wherein the position determining unit stores a first image pixel that is within the first region in a pixel location in the memory that corresponds with the coordinates of the first image pixel.

14. The display controller of claim 13, wherein the combining unit reads a first image pixel that is within the first region from the memory.

15. The display controller of claim 12, wherein the position determining unit stores a first image pixel that is within the second region in a pixel location in the memory that corresponds with the coordinates of the first image pixel.

16. The display controller of claim 12, wherein the position determining unit stores a second image pixel that is within the second region in a pixel location in the memory that corresponds with the coordinates of the second image pixel.

17. The display controller of claim 12, wherein the combining unit combines a first image pixel with a spatially corresponding second image pixel by adding the pixels.

18. The display controller of claim 12, wherein the combining unit combines a first image pixel with a spatially corresponding second image pixel by subtracting one pixel from the other.

19. The display controller of claim 12, further comprising a region specifying unit to specify the first and second regions.

20. The display controller of claim 12, wherein the display controller generates replacement pixels in real-time.

21. A display controller comprising:
(a) a memory to store image data, the memory having a plurality of pixel locations for pixels of an image, the pixel locations corresponding with the coordinates of the respective pixels in a space; and
(b) a position determining unit to determine whether a pixel is within one of at least a first and a second region of the space, to write pixels of a first image that are within a first region to pixel locations in the memory that correspond with the coordinates of the respective first image pixels, and to write pixels of a second image that are within the second region to pixel locations in the memory that correspond with the coordinates of the respective second image pixels, wherein the second image has an exposure period that is distinct from the exposure period of the first image.

* * * * *